United States Patent [19]

Schroder et al.

[11] Patent Number: 5,305,198
[45] Date of Patent: Apr. 19, 1994

[54] METHOD AND APPARATUS FOR THE IMMEDIATE ALLOCATION OF TARGET CALLS IN ELEVATOR GROUPS BASED UPON OPERATING COSTS AND VARIABLE BONUS AND PENALTY POINT FACTORS

[75] Inventors: Joris Schroder, Luzern; Paul Friedli, Remetschwil, both of Switzerland

[73] Assignee: Inventio AG, Hergiswil NW, Switzerland

[21] Appl. No.: 659,022

[22] Filed: Feb. 20, 1991

[30] Foreign Application Priority Data

Feb. 22, 1990 [CH] Switzerland ............... 00570/90

[51] Int. Cl.$^5$ .................... G05B 13/00; B66B 1/24
[52] U.S. Cl. ........................... 364/402; 364/148; 364/156; 187/127
[58] Field of Search ............... 364/400, 401, 402, 148, 364/156; 187/101, 121, 124, 125, 127

[56] References Cited

U.S. PATENT DOCUMENTS

| | | | |
|---|---|---|---|
| 3,561,571 | 2/1971 | Gingrich | 187/127 |
| 4,363,381 | 12/1982 | Bittar | 187/29.1 |
| 4,448,286 | 5/1984 | Kuzunuki et al. | 187/29.1 |
| 4,691,808 | 9/1987 | Nowak et al. | 187/127 |
| 4,718,520 | 1/1988 | Schroder | 187/127 |
| 4,815,568 | 3/1989 | Bittar | 187/127 |
| 4,836,336 | 6/1989 | Schroder | 187/121 |
| 4,846,311 | 7/1989 | Thangavelu | 187/125 |
| 4,989,695 | 2/1991 | Kubo | 187/101 |
| 4,991,694 | 2/1991 | Friedli | 187/127 |
| 5,022,497 | 6/1991 | Thangavelu | 187/127 |
| 5,024,295 | 6/1991 | Thangavelu | 187/127 |
| 5,092,431 | 3/1992 | Schroder | 187/127 |

FOREIGN PATENT DOCUMENTS

| | | |
|---|---|---|
| 0026406 | 4/1981 | European Pat. Off. . |
| 0030823 | 6/1981 | European Pat. Off. . |
| 0246395 | 11/1987 | European Pat. Off. . |
| 0342008 | 11/1989 | European Pat. Off. . |
| 2110423 | 6/1983 | United Kingdom . |
| 2214662 | 9/1989 | United Kingdom . |

*Primary Examiner*—Roy N. Envall, Jr.
*Assistant Examiner*—Jennifer L. Hazard
*Attorney, Agent, or Firm*—William J. Clemens

[57] ABSTRACT

A method of controlling a group of elevators allocates target calls definitively and immediately to the individual elevators for serving the call according to higher rank and lower rank function requirements and these allocations are indicated immediately at the call input floors. A weighted sum corresponding to higher rank function requirements is formed from partial operating costs, this sum is modified into operating costs in the sense of lower rank function requirements by means of variable bonus and penalty point factors and a target call is allocated to the elevator with the lowest operating costs. A target call allocation algorithm with subordinate algorithms for the bonus and penalty point tracking and the costs computation implements this method in a computer. The bonus and penalty point factors are continuously made to follow the traffic volume or the car load group by group or elevator by elevator with the tracking algorithm. The computation of the operating costs takes place in the costs computation algorithm according to a special costs formula, wherein the readjusted bonus and penalty point factors act multiplicatively on a six term partial costs sum.

13 Claims, 3 Drawing Sheets

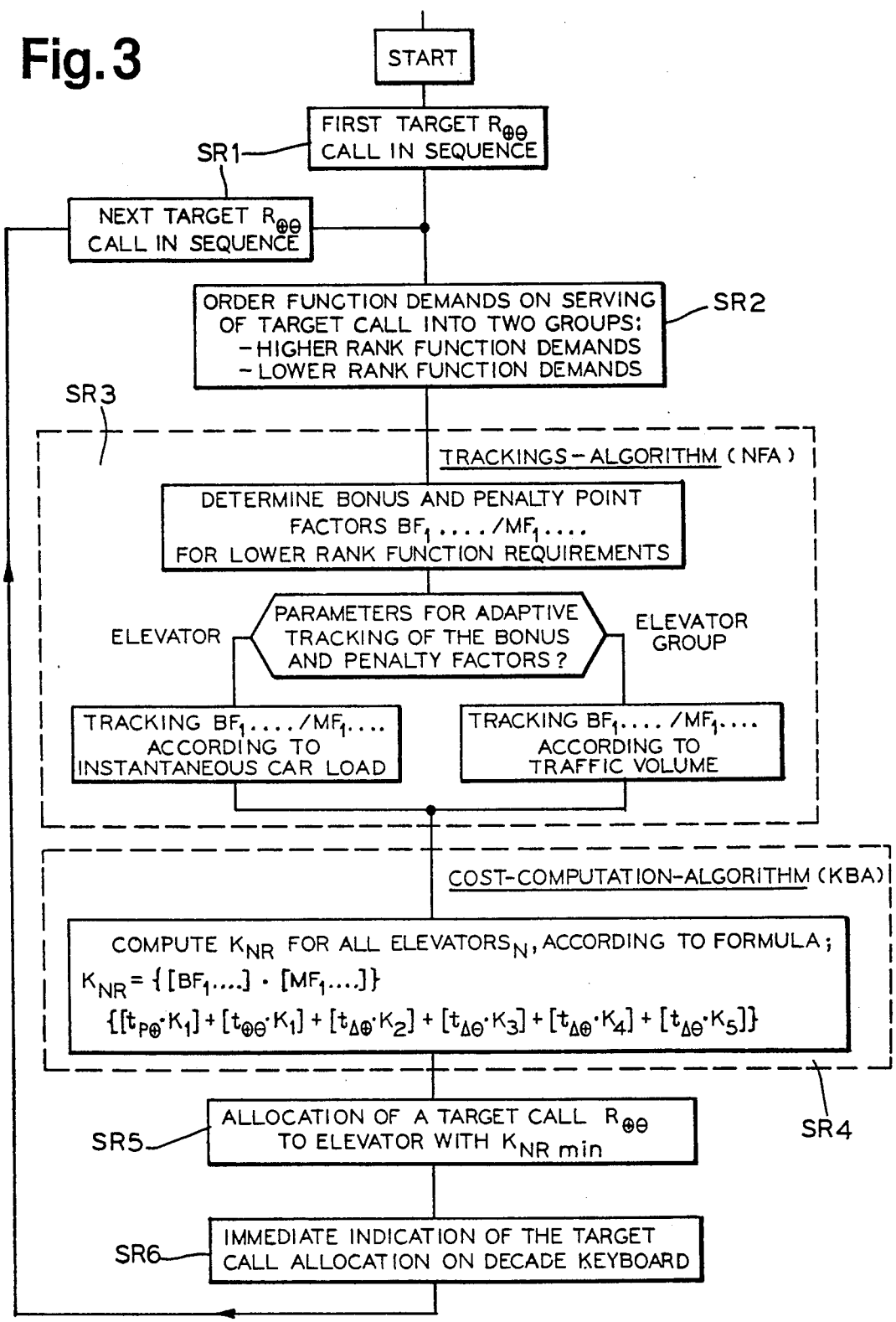

METHOD AND APPARATUS FOR THE IMMEDIATE ALLOCATION OF TARGET CALLS IN ELEVATOR GROUPS BASED UPON OPERATING COSTS AND VARIABLE BONUS AND PENALTY POINT FACTORS

BACKGROUND OF THE INVENTION

The present invention relates generally to elevator control systems and, in particular, to a method and an apparatus for the immediate allocation of target calls, also called destination hall calls, within an elevator group.

In a known elevator group control, target calls for travel to desired floors are entered by call registering devices arranged on the floors. These target calls are allocated immediately to the individual elevators of the elevator group by a superordinate target call allocation algorithm supported by a microprocessor. A subordinate costs computation algorithm computes operating costs from elevator related data for each elevator and each target call. The costs are formed as a multipart sum of partial operating costs and correspond to the waiting times and other lost times of passengers. The operating costs of all the elevators are then compared one with the other for each target call and a target call is immediately and definitively allocated to that elevator which displays the smallest corresponding operating costs. The call allocations are indicated on the call registering devices for the potential passengers at the floors.

By such methods as described above, the allocation of target calls to elevators is undertaken in the sense of a special functional behavior to be produced by the elevator group. Such an allocation can be influenced in that one modifies individual, or several, or all terms of the sum of the costs computation in order to improve the traffic development according to special criteria.

In modern controls for elevator groups, the allocation of floor and target calls to the individual elevators takes place in dependence on group-related factors representing the operational status of a elevator group. This reference to the operational status prevailing at the instant of the call allocation permits a better adaptation of the call allocation to the changing traffic incidence and moreover increases the traffic performance.

Thus, a group control for elevators with immediate allocation of target calls is shown in the Swiss Patent Application No. 03-275/88-5, see U.S. Pat. No. 4,991,694 issued Feb. 12, 1991, in which target calls are allocated immediately to a elevator for being served directly after registration. The calls are served on the basis of the effort which is necessary for a call to be served by an elevator and dependent on the instantaneous operational status of the elevator group. Counting as effort is the lost time sum, which is the total time loss that all traffic participants must suffer because of the call being served and which is called operating costs that are computed separately for each elevator. Within the scope of the target call allocation algorithm (ZZA), these operating costs $K_{NR}$ are computed according to a special costs formula for each elevator and for each target call. The costs are compared call by call in a comparator and the call is subsequently definitively allocated to that elevator which displays the lowest operating costs. For the determination of the operating costs $K_{NR}$, the same are split up, according to the traffic participants for whom they arise, into call costs ($K_{rs}$; $K_{rz}$), passenger costs ($K_{ps}$; $K_{pz}$) and waiting costs ($K_{ws}$; $K_{wz}$) and represented by the following sum:

$$K_{NR}=(K_{rs}+K_{rz})+(K_{ps}+K_{pz})+(K_{ws}+K_{wz}).$$

In that case, the call costs ($K_{rs}+K_{rz}$) correspond to the lost times of the traffic participants using the target call concerned, the passenger costs ($K_{ps}+K_{pz}$) correspond to the lost times of the passengers in the car who are not utilizing the target call concerned, and the waiting costs ($K_{ws}+K_{wz}$) correspond to the lost times of the later boarding passengers on the floors who are not utilizing the target call concerned.

The factors, which the individual terms of the sum form, concern time periods and passenger numbers and reflect the respective operational status of the elevator group. As a consequence of these relative status factors, the target call allocation is also relative, namely dependent on and related to the instantaneous operational state of the elevator group at the instant of the call allocation. Although such a target call allocation ascertained according to relative allocation criteria represents an improvement in elevator controls, certain disadvantages are nevertheless entailed by it. These disadvantages result substantially from the circumstance that a target call allocation on the basis of the aforementioned costs formula does not in all cases allocate the target calls in the sense of the demanded functional behavior of modern elevator groups.

A first disadvantage is that ergonomic functional requirements which, for example, concern the habitual accepted behavior of the elevator users, cannot be covered by a lost time minimization. Thus, for example, three "simultaneously" entered identical target calls are distributed over three elevators in the same operational status and parked at the same floor. This is correct from the aspect of the lost time. If all three persons would board the same car, a door opening time, which all three persons would have to endure, would be three times as long as for merely one boarding passenger. On the other hand, in this case, the behavior of the elevator group in minimizing the lost time is incomprehensible or even irritating to the passengers because it contradicts the behavior of a group wherein, typically, only one person enters the target. The pure costs algorithm does not do what this group actually wants to do, namely to "travel as a group". Furthermore, the target floor is blocked for the opposite direction through the simultaneous occupation of the three elevators in the same direction.

A second disadvantage results from the circumstance that, in a target call allocation on the basis of the aforementioned costs formula, the target calls are allocated according to merely a single allocation criterion, namely according to the minimum lost time of all traffic participants. Further function requirements, which should likewise be considered in a target call allocation as allocation criteria for elevator groups, must in that case remain unconsidered. A target call allocation of that kind meets only a portion of the demanded group functions and can therefore not be optimal.

Furthermore, it has proved to be disadvantageous that the target call allocation method according to Swiss Patent Application No. 03-275/88-5, see U.S. Pat. No. 4,991,694 issued Feb. 12, 1991, is based on a closed costs formula which permits no modifications, for example for further allocation criteria What is needed is a target call allocation algorithm with allocation criteria adapting automatically, in kind and number, to kinds of traffic and intensities of traffic, thus a target call allocation which is optimisable for each application.

SUMMARY OF THE INVENTION

Accordingly, the present invention provides a method and an apparatus which allocates the target calls to be served by an elevator group in accordance with a predetermined set of function requirements. In particular, this novel target call allocation method is capable of being adapted selectively to individual ones of these function requirements in order to promote or relegate these functions individually. The method and the apparatus are structured so that they can be oriented rapidly and simply to a plurality of function requirements to be optimisable for different kinds and intensities of traffic.

A first advantage of the invention is that, because of the flexibility of the costs computation algorithm used for the computation of the operating costs, the functional behavior demanded of elevator groups can be optimized within wide limits by corresponding target call allocations. The individual terms of the sum in the costs computation formula can be weighed by bonus or penalty points to better adapt the first function profile to a demanded function profile. This, for example, concerns functions which are associated with the personal behavior of the elevator users and cannot be taken into consideration by the terms of the sum of the costs computation formula, or it concerns the correction or elimination of boundary functions which occur only rarely, but are not tolerated by the elevator users.

A further advantage relates to greatly different waiting times which type of operation is felt to be particularly unpleasant to the elevator users. The waiting times can be reduced or at least be equalized one among the other through appropriate weighing of the individual terms of the sum in the costs formula by the variable bonus or penalty points.

Furthermore, it has proved to be advantageous that the normal coincidences of desired floor stops are implicitly contained in the terms of the sum of the costs computation formula and need not be introduced into the target call allocation by way of the variable bonus or penalty points. It has also been proved that the information, which has been entered at the earliest possible instant by a target call and which fully defines this operational demand, can be utilized optimally by the six term sum of costs computation formula and that additional ergonomic and traffic technical requirements can be taken into consideration by the variable bonus or penalty points. This assures a facilitation in the management of the passenger traffic and generally an increased conveying performance.

The use of a computer of any desired kind for the performance of elevator group control according to known methods is well known and described in numerous patent specifications. However, the apparatus according to the present invention uses a computer for the performance of the operational control of the entire system in accordance with the method of operation described above for assuring a special operational behavior of the elevator group.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a flow diagram of the target call allocation algorithm according to the present invention and used in the computer shown in the FIG. 1 with subordinate algorithms for the costs computation and the readjustment of the bonus and penalty points.

DESCRIPTION OF THE PREFERRED EMBODIMENT

Figure 1:
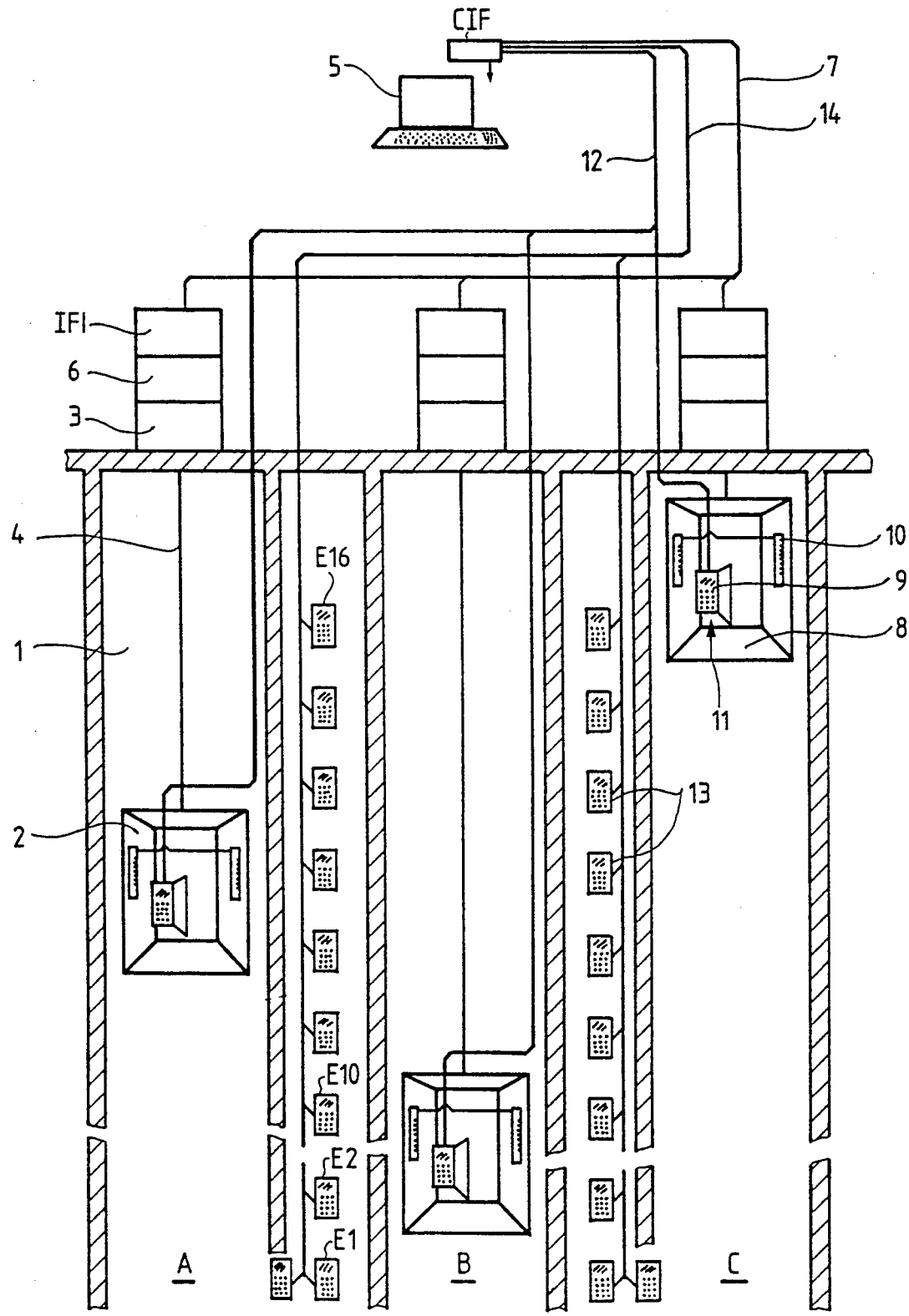
FIG. 1 is a schematic representation of an elevator group consisting of three elevators utilizing the control apparatus and method according to the present invention.

In the FIG. 1, the elevators of an elevator group are designated by A, B and C, wherein a car 2 is guided in a elevator shaft 1 for each elevator and is driven in a known manner by a hoist motor 3 by way of a hoisting cable 4 to serve sixteen floors E1 to E16. Each drive 3 is controlled by a drive control shown, for example, in the European Patent No. 0 026 406. In that system, the target value generation, the regulating functions and the start-stop initiation are realized by means of a computer 5.

Measuring and adjusting elements 6 are connected to the computer 5 by a first interface IF1 and an elevator bus 7. Each car 2 includes a load measuring device 8, a call indicating device 9 signalling the respective operational state Z of the car, a stop indicator 10 and a car operating panel 11. The devices 8, 9, 10 and 11 are connected through a car bus 12 with the computer 5. Since no car call buttons are provided in the cars 2, no car calls can be entered so that this elevator group is operated without car calls and exclusively by target calls.

The target call input devices for example, which are provided on the floors $E_1$ to $E_{16}$, are constructed as decade keyboards 13 of the type shown in the European Patent No. 0 246 395. Through the keyboards 13, target calls to all desired target call floors E1 to E16 can be entered. These target calls are then allocated to one of the cars 2 according to the allocation method of the present invention which is explained in detail below. The decade keyboards 13 are connected to the computer 5 by a floor bus 14. The elevator bus 7, the car bus 12 and the floor bus 14 are connected to the computer 5 by a second interface CIF. The computer 5 can be of any suitable configuration such as a separate computer for each elevator car with one of the computers also controlling the group functions, a single computer for the elevator group as shown, or a single computer for two or more elevator groups.

Figure 2:
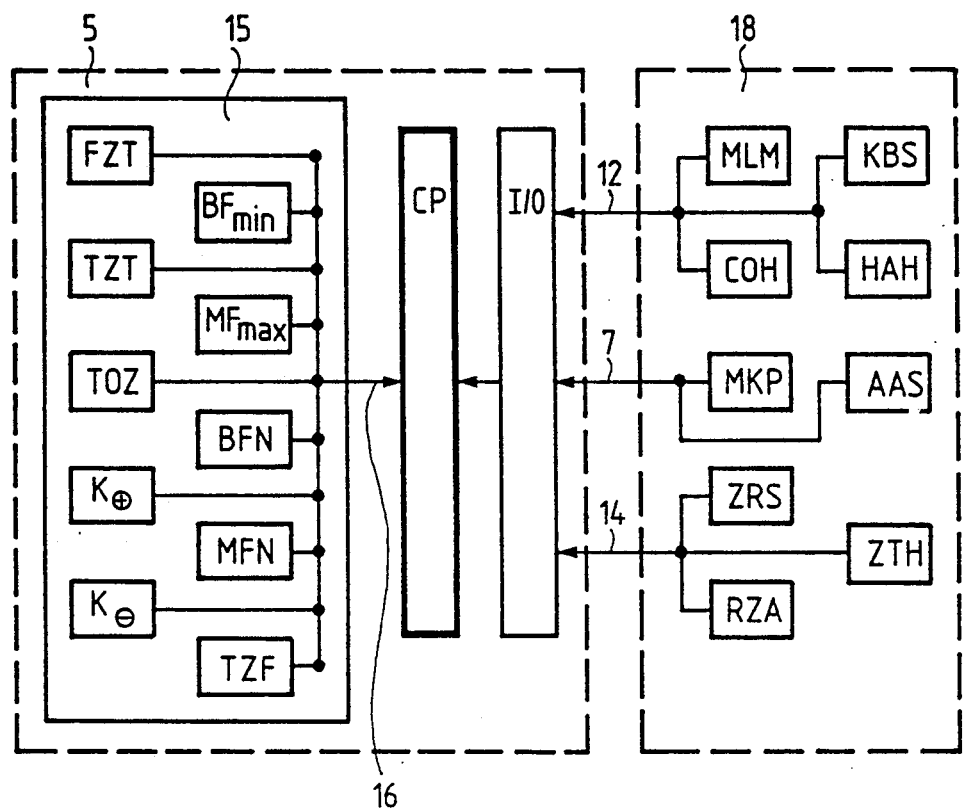
FIG. 2 is a block diagram of the computer and elevator system for the elevator group shown in the FIG. 1.

FIG. 2 is a schematic illustration of the computer 5 with the most important data sources and data sinks shown, which sources and sinks participate in the method according to the present invention and are situated either in an elevator system 18 or in an internal read-write memory 15. In both cases, the data sources and the data sinks are connected bilaterally from the elevator system 18 to a processor CP of the industrial 5. The connection from the elevator system 18 is by way of a threefold bus system (the elevator bus 7, the car bus 12 and the floor bus 14) and input/output elements I/O, and the connection from the read-write memory 15 is by an internal bus 16.

Transmitted on the floor bus 14 are target calls $R_{\oplus\ominus}$ registered on the floors E1 to E16 and detected as represented by a source ZRS, target call allocations already made and indicated on the corresponding decade keyboards 13 as represented by a source RZA, and all other functions necessary for the operating of the decade keyboards 13 as represented by a source ZTH. The elevator bus 7 serves to connect the drives 3 of the individual elevators A, B and C to transmit the continuous detection of the instantaneous car position as represented by a source MKP and the elevator drive status as represented by a source AAS for use in the costs computation, as well as further data in conjunction with the control and regulation of the drives 3. The car bus 12 provides a path for the instantaneous car load as represented by a source MLM, the car operating status as represented by a source KBS, as well as further data sources and data sinks COH and HAH in conjunction with the operation of the car operating panel 11, or the stop indicator 10.

For the implementation of the target call allocation algorithm ZZA, forming the basis of the method according to the present invention, the processor CP is connected to further data sources and data sinks in the read-write memory 15 Of importance are preset constants or status variables which are measured in the elevator system and partially re-adjusted continually. Associated with these tabularly organized data sources and data sinks are the minimum values of the bonus factors $BF_{min}$, the maximum values of the penalty point factors $MF_{max}$, the numerical value for the bonus factor tracking BFN and the penalty point factor tracking MFN, the door times TZT, the travel times FZT, the foreseeable number of boarding passengers per stop $K_{\oplus}$, the foreseeable number of alighting passengers per stop $K_{\ominus}$, as well as the transfer time per passenger TZF.

FIG. 3 shows the structure and the sequential course of the target call allocation algorithm ZZA which forms the basis of the method according to the present invention. The algorithm ZZA has two subordinate algorithms: NFA for the tracking of bonus or penalty points and a costs computation KBA.

The method begins with the detection of the target calls $R_{\oplus\ominus}$ entered on the floors $E_1$ to $E_{16}$ which takes place in a known manner by a sequential scanning of all decade keyboards 13 wherein the target calls $R_{\oplus\ominus}$ to be allocated as trips from a boarding stop $\oplus$ to an alighting stop $\ominus$ are read into the computer 5 by way of the floor bus 14. Furthermore, the computer 5 is connected by way of the elevator bus 7 with the drives 3 and by way of the car bus 12 with the cars 2. Therefore, the computer 5 knows the load, the position, and the operational status of the cars 2, the operational status of the drive 3 for each elevator at any instant and it possesses further details about the previous traffic volume and the instantaneously valid bonus or penalty point factors $BF_1 \ldots$ and $MF_1 \ldots$. Such data makes it possible for the target call allocation algorithm ZZA according to the present invention to allocate newly entered target calls $R_{\oplus\ominus}$ in accordance with preset criteria to the elevators A, B and c and thus ascertain a target call allocation which is an optimum according to those criteria. The criteria represent substantially function demands for serving the calls. Such a target call allocation takes place at the processing speed of the computer 5 after the detection of the target call $R_{\oplus\ominus}$ within the scope of the sequential target call processing of all floors; and the allocation is definitive and indicated immediately on the associated decade keyboard 13. The basis Of the target call allocation according to the present invention is the operating costs $K_{NR}$, which costs are calculated according to the following formula:

$$K_{NR} = [BF_1 \ldots) \cdot (MF_1 \ldots)] \cdot [K_1 + BF_2 \cdot K_2 + MF_2 \cdot K_3 + \ldots + \ldots + K_n] \quad (I)$$

wherein $BF_1 \ldots$ are variable bonus factors, $MF_1 \ldots$ are variable penalty point factors and $K_1, K_2, K_3 \ldots K_n$ are partial operating costs. The bonus point factor BF is a number by which one or more terms of the cost computation formula are multiplied to reduce the total cost and make the associated elevator car more likely to be selected to serve the target call. The factor BF falls in a range having a maximum value of one and a minimum value of $BF_{min}$. The penalty point factor MF is a number by which one or more terms of the cost computation formula are multiplied to increase the total cost and make the associated elevator car less likely to be selected to serve the target call. The factor MF falls in a range having a maximum value of $MF_{max}$ and a minimum value of one. The bonus point factor BF and the penalty point factor MF numbers are related to corresponding ergonomic and technical parameter requirements of the individual elevators and the elevator group. These numbers are determined empirically to optimize the operation of the elevators and are stored in a table. For example, for each one of a plurality of different traffic volumes, there will be stored a corresponding bonus point factor number; the higher the traffic volume, the higher the number.

The variable bonus or penalty point factors act as multipliers each on a respective one, on all or on as many terms as desired, of the partial operating costs $K_1$ to $K_n$. Operating costs $K_{NR}$ computed in such a manner represent a measure of the capability of operation of an elevator A, B and C in respect of a target call $R_{\oplus\ominus}$ which is then allocated for serving to that elevator A, B and C which possesses the greatest capability of operation, i.e. displays the lowest operating costs $K_{NR}$.

The preferred method of operation according to the present invention now will be explained in detail with reference to the target call allocation algorithm ZZA shown in the FIG. 3. In this case, a trip is assumed as is typical for the target calls $R_{\oplus\ominus}$. This example is characterized by the partial operating costs $K_1$ to $K_n$ being restricted to the lost time of all passengers expressed in passenger-seconds, that only one single bonus B and penalty point M is provided, namely an alighting coincidence bonus $B_{\oplus\ominus}$ and a picking-up penalty point $M_F$, and that the corresponding bonus and penalty point factors $BF_{\oplus\ominus}$ and $MF_F$ respectively act in like manner multiplicatively on all partial operating costs $K_1$ to $K_n$, i.e. on their sum. This results in the following operating costs formula for the preferred method according to the present invention:

$$K_{NR} = [BF_{\ominus\ominus} \cdot MF_F] \cdot [t_{p\oplus} \cdot K_1] + [t_{\oplus\ominus} \cdot K_1] + [t_{\Delta\oplus} \cdot K_2] + [t_{\Delta\ominus} \cdot K_3] + [t_{\Delta\oplus} \cdot K_4] + [t_{\Delta\ominus} \cdot K_5] \quad (II)$$

$t_{p\oplus}$ is the time needed by the car to get from the instantaneous position (P) to a boarding stop ($\oplus$) to be newly allocated (nzz), including delays due to intermediate stops, $t_{\oplus\ominus}$ is the traveling time from an nzz boarding stop ($\oplus$) to the corresponding (nzz) alighting stop ($\ominus$) to be newly allocated, $t_{\Delta\oplus}$ is the Δ-time (delay time) at an nzz boarding stop ($\oplus$), $t_{\Delta\ominus}$ is the Δ-time (delay time) at an nzz alighting stop ($\ominus$), $K_1$ is the foreseeable number, ascertained from the traffic conditions, of new passengers which will be associated with a target call ($R_{\oplus\ominus}$), namely boarding passengers at the corresponding boarding stop ($\oplus$) or alighting passengers at the corresponding alighting stop ($\ominus$), $K_2$ is the foreseeable number, ascertained from the traffic conditions, of passengers who will be in the car during an nzz boarding stop ($\oplus$) (without boarding passengers $K_1$), is the foreseeable number, ascertained from the traffic conditions, of passengers who will be in the car during an nzz alighting stop ($\ominus$) (without alighting passengers $K_1$);

$K_4$ is the number of all boarding passengers for all already allocated (bzg) boarding stops ($\oplus'$) behind the new boarding stop ($\oplus$); and $K_5$ is the number of all boarding passengers for all (bzg) boarding stops ($\oplus'$) behind the nzz alighting stop ($\ominus$).

In the FIG. 3, the allocation procedure commences with a step SR1 when a registered, not yet allocated target call $R_{\oplus\ominus}$ is entered into the computer 5 for allocation. The serving of this target call $R_{\oplus\ominus}$ takes place according to criteria which, as function demands on the serving of the call, are preset for and form the basis of the target call allocation. For this purpose, these function demands on the serving of the call are ordered hierarchically in a second step SR2 and in that case divided up into two groups, namely a first group for the higher ranking function demands and a second group for the lower ranking function demands. This division is necessary because a distinction is made between these groups in the subsequently described costs computation according to a step SR4 in that the higher rank function demands are represented by the partial operating costs $K_1$ to $K_n$ and the lower ranking function demands are represented by the bonus and penalty point factors $BF_1$ ... and $MF_1$ ....

The completion of the step SR2 leads into the bonus and penalty point tracking algorithm NFA, which is subordinate to the target call allocation algorithm ZZA, as a step SR3 ascertains the bonus and penalty point factors $BF_1$ ... and $MF_1$ ... and which, according to a stored value table, adaptively readjusts to follow a parameter of the elevator group or a parameter of an individual elevator. In both cases, a preferred example of the possible tracking parameters is used each time, namely the traffic volume for the elevator group and the car load for the individual elevator. If the instantaneous traffic volume is small now, for example, the bonuses and penalty points $B_1$ ... and $M_1$ ... are increased, i.e. the corresponding bonus factors $BF_1$ ... are reduced and the corresponding penalty point factors $MF_1$ ... are increased. If the instantaneous traffic volume is great, near saturation for example, the bonuses and penalty points $B_1$ ... and $M_1$ ... are reduced, i.e. the corresponding bonus factors $BF_1$ ... are increased and the penalty point factors $MF_1$ ... are reduced. If the instantaneous traffic volume finally corresponds to a standardized value, no reason exists to change the instantaneously present bonus and penalty point factors $BF_1$ ... and $MF_1$ .... The values, by which the bonus and penalty point factors $BF_1$ ... and $MF_1$ ... are respectively incremented and decremented, are stored in a table as empirical values as a function of the traffic intensity. In an analogous manner, the bonus and penalty point factors $BF_1$ ... and $MF_1$ ... are readjusted for a single elevator to follow one of its operational parameters, for example, its instantaneous car load.

In the next step, a step SR4, the operating costs $K_{NR}$ are computed. This costs computation takes place by means of the costs computation algorithm KBA by reason of the actual, i.e. readjusted bonus and penalty point factors $BF_1$ ... and $MF_1$ ... and the higher ranking function demands according to the previously explained costs formula II. According to the preferred method of operation, the costs formula II contains only one each bonus factor $BF_{\ominus\ominus}$ and penalty point factor $MF_A$, which both act as multipliers in like manner on the totality of the partial operating costs representing the lost times of all passengers. This costs computation takes place only once after registration of the corresponding target call $R_{\oplus\ominus}$ and is definitive.

In a step SR5, the one of the elevators A, B and C is determined which is to serve the present target call $R_{\oplus\ominus}$. This operation takes place in known manner by reason of the operating costs $K_{NR}$ computed in the step SR4 according to the disclosure in the previously discussed Swiss Patent Application No. 03-275/88-5. In this case, the operating costs $K_{NR}$ computed in the step SR4 are compared call by call, one among the other and the one of the elevators A, B or C with the lowest operating costs $K_{NR}$ is determined for serving the target call $R_{\oplus\ominus}$. Directly after the determination of a target call allocation, the allocation indication takes place in a next step SR6. In that case, the one of the elevators A, B or C determined for serving the call is indicated on the decade keyboard 13 on which the corresponding target call $R_{\oplus\ominus}$ was entered. In a like manner, the next cycle through the target call allocation algorithm ZZA for the allocation of the next target call $R_{\oplus\ominus}$ takes place in sequence.

In another manner of consideration, it can be said that the target call allocation according to the present invention is undertaken with a view to three function demands set on the serving of the call, namely "minimum lost time sum", "alighting coincidence" and "no further call allocation during the picking-up trip". These three function demands are, however, not equivalent in their significance, but divided hierarchically into two stages, namely the "minimum lost time sum" in the first priority stage (higher rank), and the "alighting co-incidence" and "no further call allocation during the picking-up trip" in the second priority stage (lower rank).

Basically, the elevator group is so designed in its conveying capacity that the higher rank function demand, namely a good temporal behavior in the traffic management (lost time sum $K_v$ in passenger-seconds), is assured for a standardized traffic volume. For a lower traffic volume, this higher rank function demand is accordingly fulfilled with great reserve so that the lower rank function demands "alighting coincidence" and "no further call allocation during picking-up trip" can be favored at its expense through an increase in the corresponding bonus $B_{\ominus\ominus}$ or the corresponding penalty point $M_F$. As long as the lost time sum $K_v$ is smaller than the required minimum, it can be expected that a target call $R_{\oplus\ominus}$ will "wait" for a car with "alighting coincidence" and "no further call allocation during picking-up trip", i.e. to accept a car which displays a worse temporal behavior, but on the other hand has the functiond demands "alighting coincidence" and "no further call allocation during picking-up trip".

At high traffic volume near saturation and for large bonuses and penalty points, the aforementioned higher rank function demands with a great deficit is not fulfilled so that the lower rank function demands "alighting coincidence" and "no further call allocation during picking-up trip" must be discriminated against in its favor through reduction of the corresponding bonuses and penalty points $B_{\ominus\ominus}$ and $M_F$. As long as the resultant lost time sum $K_v$ is greater than the permitted maximum, a target call will accept a car which does not possess the function demands "alighting coincidence" and "no further call allocation during picking-up trip", but for this operation displays a better temporal behavior.

Finally, the higher rank function demand is fulfilled according to definition in a standardized traffic volume, whilst both the lower rank function demands are adapted by way of the corresponding bonus and penalty point factors $BF_{\ominus\ominus}$ and $MF_F$. Thus, a balanced optimum adaptation of the higher rank and the lower rank function demands is present, for which reason the corresponding bonus and penalty point factors $BF_{\ominus\ominus}$ and $MF_F$ must not be changed, but must be carried over unchanged into the next costs computation.

Figure 4:
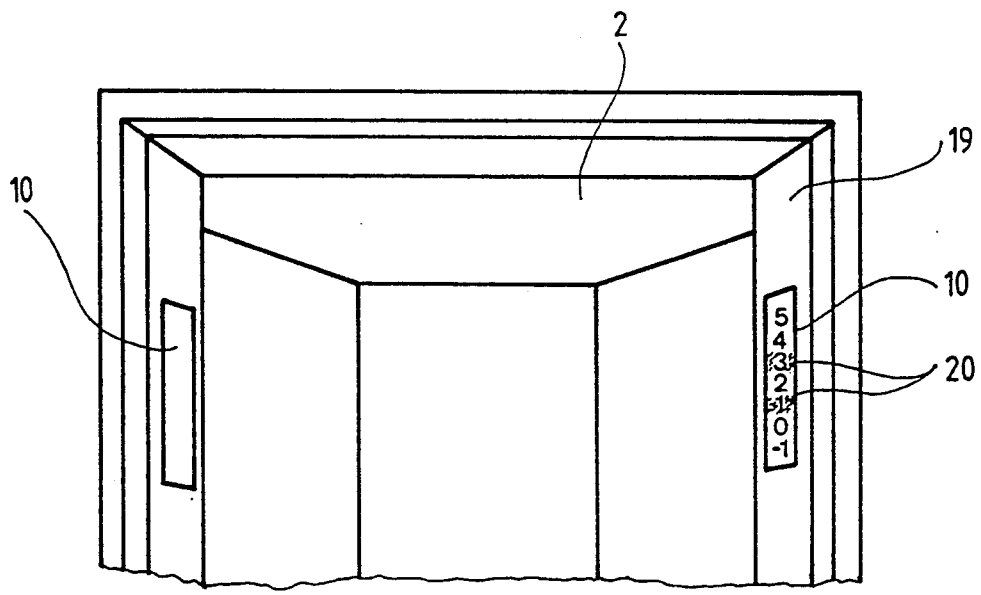
FIG. 4 is a perspective fragmentary view of the stop indicator in the car entryway for the performance of the method according to the present invention with the elevator control shown in the FIG. 1.

The FIG. 4 shows an illustration of the stop indicator 10 which is provided for displaying information to the passengers for the target call control. A stop indicator 10 is mounted at each car 2 at both sides of a car door frame 19 at eye level and visible from inside and outside the car. Thus, during a boarding stop or during a trip, the target floors which have already been allocated can be indicated. For target indication at a boarding stop, the target floors of the passengers boarding at the floor concerned are flashing 20 on the stop indicator 10 until the door is closed and thereafter continue to light up steadily. For target indication during a trip, a target floor begins to flash on the stop indicator 10 when the selector jumps to the corresponding floor and the target floor extinguishes when the door opens.

The method according to the present invention is performed wherein a complete range of three half-rounds from the instantaneous car position are taken into consideration for the computation of the operating costs of a target call in respect of an elevator. The distance that an elevator car must travel from a predetermined floor in a predetermined direction in order to serve that floor again in the same direction of travel is known as a "full-round", a "half-round" being one half of that distance. The partial operating costs which represent the lost times of all passengers caused by the serving of a target call are computed according to the algorithm $K_{NR}$ which has been defined above. The bonus factors and the penalty point factors can act exponentially or in another suitable mathematical function on the partial operating costs of the operating costs to achieve the desired operation. The traffic volume of the elevator group can be provided as an operational parameter for the variation of the bonus factors and the penalty point factors with respect to the group wherein the numerical values of the factors follow respectively between $BF_{min}$ and $MF_{max}$ at minimum traffic volume and are another value at the maximum traffic volume.

The instantaneous car load also can be provided as an operational parameter for the variation of the bonus factors and the penalty point factors for an elevator wherein the numerical values of the factors follow adaptively respectively between $BF_{min}$ and $MF_{max}$ at minimum load and another value is utilized at maximum load.

Furthermore, the method can completely separate the boarding traffic from the alighting traffic as a desired function of the elevator group by a variable boarding coincidence bonus at the start and a variable alighting coincidence bonus at the target. The formation of passenger groups is another desired function of the elevator group and is promoted by a variable group bonus. The method can protect a picking-up trip in the third half round against further call allocations by the use of a variable picking-up trip penalty point.

In summary, the present invention concerns an apparatus for the immediate target call allocation in elevator groups including decade keyboards located on the floors served by elevator cars of a group for entering target calls for desired floors, load measuring devices provided in the elevator cars of the group, selectors associated with each elevator car of the group and indicating each time the floor of a possible stop, and means for allocating the entered calls to the elevator cars of the group. The means for allocating includes a computer and comparison means having for each elevator car of an elevator group for storing elevator related data a door time table in which the times of door opening and door closing are stored, a travel time table in which the traveling times between a certain floor and each other floor are stored separately according to upward and downward direction of travel, a position register in which the instantaneous car position is stored, and a costs register, the computer and comparison means being connected by a communications interface with the elevator cars of an elevator group, with load measuring devices provided in the elevator cars and with decade keyboards on floors served by the elevator cars. The computer and comparison device performs a method for the immediate target call allocation on the basis of operating costs and variable bonus and penalty point factors, in which method target calls to desired target call floors can be entered at the decade keyboards located on the floors, wherein the target calls are allocated immediately after call input to the individual elevators of the elevator group by a superordinate target call allocation algorithm (ZZA) processed by a computer and such allocations are indicated immediately on call indicating devices, wherein a subordinate costs computation algorithm (KBA) computes operating costs ($K_{NR}$) from the elevator related data for each elevator and each target call, which operating costs are formed as a multipart sum of partial operating costs ($K_1$ to $K_n$) and correspond to the waiting times and other lost times of passengers, and wherein the operating costs of all elevators are then compared one with the other for each target call and a target call is immediately allocated definitively to that elevator which displays the smallest corresponding operating costs ($K_{NR}$).

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A computer implemented method for immediately allocating target calls to elevator cars in an elevator group, the elevator group including an elevator control responsive to an entry of a target call for allocating the target call immediately after entry to an individual elevator car of the elevator group by calculating operating costs ($K_{NR}$) associated with each elevator car of the elevator group from elevator related operating parameter data for each elevator car and the target call, the operating costs being formed as a multipart operating cost sum of partial operating costs ($K_1$ to $K_n$), the operating costs associated with all the elevator cars being compared one with the other and the target call being immediately allocated to the elevator car having a smallest sum of the associated operating costs, the method comprising the steps of:
   a. determining a plurality of function demands which define a method of operation of an elevator group for allocation of a target call to one elevator car of the elevator group and storing a first plurality of bonus point factor values ($BF_1$ ...) and a second plurality of penalty point factor values ($MF_1$ ...) in a memory, each said value being related to a corresponding operating parameter data for an elevator car in the elevator group, each said bonus point factor value being within a range between a minimum value $BF_{min}$ and "1" wherein $0 < BF_{min} < 1$ and each said penalty point factor value being within a range between a maximum value $MF_{max}$ and "1" wherein $MF_{max} > 1$;
   b. responding to entry of a target call for the elevator group by ordering said function demands into at least two groups, higher ranking function demands and lower ranking function demands;
   c. representing said higher ranking function demands by corresponding partial operating costs ($K_1$ to $K_n$) and said lower ranking function demands by corresponding ones of said bonus point factors ($BF_1$ ...) and said penalty point factors ($MF_1$ ...) according to the corresponding operating parameter data for each elevator car in the elevator group;
   d. reading from the memory and applying said bonus point factor values ($BF_1$ ...) and said penalty point factor values ($MF_1$ ...) as multipliers to at least one of said partial operating costs ($K_1$ to $K_n$) and calculating a multipart sum of said partial operating costs and said multipliers representing an operating cost sum for each of the elevator cars;
   e. comparing said operating cost sums for the elevator cars to one another and immediately allocating said target call to the elevator car having the lowest one of said operating cost sums; and
   f. controlling the elevator car having the lowest one of said operating cost sums to travel to and stop at a floor associated with said target call.

2. The method according to claim 1 including calculating said operating cost sum for a travel of three half-rounds from an instantaneous position of each elevator car.

3. The method according to claim 1 wherein said partial operating costs represent lost times of all passengers due to serving said target call, said partial operating costs being calculated according to the formula:

$$K_{NR} = [t_{P\oplus} \cdot K_1] + [t_{\oplus\ominus} \cdot K_1] + [t_{\Delta\oplus} \cdot K_2] + [t_{\Delta\ominus} \cdot K_3] + [t_{\Delta\oplus} \cdot K_4] + [t_{\Delta\ominus} \cdot K_5].$$

4. The method according to claim 1 wherein said bonus point factor values and said penalty point factor values are applied to said partial operating costs as exponential multipliers.

5. The method according to claim 1 including selecting traffic volume of the elevator group as the operating parameter data, selecting a minimum traffic volume and a maximum traffic volume for the elevator cars and wherein said bonus point factor values and said penalty point factor values correspond to the traffic volume from the minimum traffic volume up to the maximum traffic volume and are another value at the maximum traffic volume.

6. The method according to claim 1 including selecting elevator car instantaneous load as the operating parameter data, selecting a minimum instantaneous load and a maximum instantaneous load and wherein said bonus point factor values and said penalty point factor values correspond to the elevator car instantaneous load from a minimum instantaneous load up to a maximum instantaneous load and are another value at the maximum instantaneous load.

7. The method according to claim 1 including completely separating boarding traffic from alighting traffic in the elevator group wherein in the step d, said bonus point factor values represent a boarding coincidence bonus point factor at a start of a travel and an alighting coincidence bonus point factor at a floor of said target call.

8. The method according to claim 1 including promoting formation of passenger groups wherein the step d. said bonus point factor values represent a variable group bonus point factor.

9. The method according to claim 1 including protecting against further target call allocations in a third half-round of a travel wherein in the step d. said penalty point factor values represent a picking-up trip penalty point factor.

10. The method according to claim 1 including indicating the elevator car to which said target call is allocated.

11. A computer implemented method for immediately allocating target calls to elevator cars in an elevator group, the elevator group including an elevator control responsive to an entry of a target call for allocating the target call immediately after entry to an individual elevator car of the elevator group by calculating operating costs ($K_{NR}$) associated with each elevator car of the elevator group from elevator related operating parameter data for each elevator car and the target call, the operating costs being formed as a multipart operating cost sum of partial operating costs ($K_1$ to $K_n$), the operating costs associated with all the elevator cars being compared one with the other and the target call being immediately allocated to the elevator car having a smallest sum of the associated operating costs, the method comprising the steps of:
   a. determining a plurality of function demands which define a method of operation of an elevator group for allocation of a target call to one elevator car of the elevator group and storing a first plurality of bonus point factor values ($BF_1$ ...) and a second plurality of penalty point factor values ($MF_1$ ...) in a memory, each said value being related to a corresponding operating parameter data for an elevator car in the elevator group, each said bonus point factor value being within a range between a minimum value $BF_{min}$ and "1" wherein $0 < BF_{min} < 1$ and each said penalty point factor value being within a range between a maximum value $MF_{max}$ and "1" wherein $MF_{max} > 1$;

b. responding to entry of a target call for the elevator group by ordering said function demands for allocation of said target call into at least two groups, higher ranking function demands and lower ranking function demands;

c. representing said higher ranking function demands by corresponding partial operating costs ($K_1$ to $K_n$) and said lower ranking function demands by corresponding ones of said bonus point factor values ($BF_1$...) and said penalty point factor values ($MF_1$...) according to the corresponding operating parameter data for each elevator car in the elevator group;

d. reading from the memory and applying said bonus point factor values ($BF_1$...) and said penalty point factor values ($MF_1$...) as multipliers to at least one of said partial operating costs ($K_1$ to $K_n$) and calculating a multipart sum of said partial operating costs and said multipliers representing an operating cost sum for each of the elevator cars for a travel of three half-rounds from an instantaneous position of each of the elevator cars;

e. comparing said operating cost sums for the elevator cars and immediately allocating said target call to the elevator car having the lowest one of said operating cost sums; and f. controlling the elevator car having the lowest one of said operating cost sums to travel to and stop at a floor associated with said target call.

12. In an apparatus for immediately allocating target calls to elevator cars in an elevator group including decade keyboards located on floors served by the elevator cars for entering target calls for desired floor and means for allocating the entered target calls to the elevator cars, the method for allocating comprising a microprocessor, including:

a memory for storing operating parameter data, bonus point factor values and penalty point factor values for elevator cars in an elevator group;

comparison means for comparing operating cost sums for each of the elevator cars in the elevator group;

means for calculating connected to decade keyboards located on floors served by the elevator cars for entering a target call for a desired floor, said means for calculating being connected to said memory and to said comparison means for calculating said operating cost sum for each of the elevator cars as a multipart sum of partial operating costs related to said operating parameter data and applying said bonus point factor values and said penalty point factor values as multipliers to at least one of said partial operating costs, said means for calculating being responsive to a smallest one of said operating cost sums for allocating said target call to the elevator car having said smallest operating cost sum; and control means connected to said means for calculating and responsive to said target call for controlling the elevator car having said smallest operating cost sum to travel to and stop at a floor associated with said target call.

13. The apparatus according to claim 12 wherein after said means for calculating allocates said target call, said means for calculating divides function demands for an elevator cars into at least two groups, higher ranking function demands and lower ranking function demands, said higher ranking function demands being represented by said partial operating costs and each of said lower ranking function demands being represented by one of a plurality of bonus point factors (BF) and penalty point factors (MF); assigns said bonus point factors and said penalty point factors a minimum bonus point factor value ($0 < BF_{min} < 1$) and a maximum penalty point factor value ($MF_{max} > 1$) respectively in accordance with a weighing of said function demands represented by said bonus point factors and said penalty point factors; and stores numerical values for said bonus point factors and said penalty point factors in accordance with a selected operating parameter of the elevator cars in ranges $BF_{min} \leq BF \leq 1$ and $1 \leq MF \leq MF_{max}$ respectively.

* * * * *